US012746805B2

(12) United States Patent
Selmi et al.

(10) Patent No.: US 12,746,805 B2
(45) Date of Patent: Sep. 29, 2026

(54) CONVERTIBLE MOTOR VEHICLE AND METHOD FOR CONTROLLING A FOLDABLE ROOF OF A CONVERTIBLE MOTOR VEHICLE

(71) Applicant: FERRARI S.P.A., Modena (IT)

(72) Inventors: Simone Selmi, Modena (IT); Manuel Salvador, Modena (IT)

(73) Assignee: FERRARI S.P.A. (IT)

( * ) Notice: Subject to any disclaimer, the term of this patent is extended or adjusted under 35 U.S.C. 154(b) by 0 days.

(21) Appl. No.: 18/965,107

(22) Filed: Dec. 2, 2024

(65) Prior Publication Data

US 2025/0178418 A1 Jun. 5, 2025

(30) Foreign Application Priority Data

Dec. 5, 2023 (IT) ..................... 102023000025968.5

(51) Int. Cl.

*B60J 7/12* (2006.01)
*B60J 7/14* (2006.01)
*G07C 5/08* (2006.01)

(52) U.S. Cl.

CPC .......... *B60J 7/1204* (2013.01); *G07C 5/0825* (2013.01); *G07C 5/0833* (2013.01); *B60J 7/143* (2013.01)

(58) Field of Classification Search

CPC ........ B60J 7/1204; B60J 7/143; B60J 7/0573; B60J 7/145; B60J 7/20; G07C 5/0825; G07C 5/0833

See application file for complete search history.

(56) References Cited

U.S. PATENT DOCUMENTS

2006/0001289 A1* 1/2006 Queveau .................. B60J 7/145 296/107.17
2006/0006701 A1* 1/2006 Wells ..................... B60J 7/0573 296/223

FOREIGN PATENT DOCUMENTS

DE 29814310 U1 11/1998
DE 102015209664 A1 * 12/2016 .............. E05F 15/71

OTHER PUBLICATIONS

English translation of Enders (DE 102015209664) (Year: 2016).*
Italian Search Report and Written Opinion, Italian Patent Application 102023000025968, Completion Date Jun. 4, 2024, 7 pp.

* cited by examiner

*Primary Examiner* — Kyle J Kingsland
(74) *Attorney, Agent, or Firm* — The Belles Group, P.C.

(57) ABSTRACT

A motor vehicle comprising a frame defining a cabin, a foldable roof movable relative to said frame and adapted to selectively cover, in use, the cabin at a top thereof and a stowage compartment adapted to contain the foldable roof is disclosed. The motor vehicle further comprises a sensory system adapted to detect a quantity associated with the humidity of the air inside the stowage compartment, signalling means adapted to signal a risk of damage to the foldable roof and an electronic control unit operatively connected to the sensory system and the signalling means. The electronic control unit is programmed to compare the quantity detected by the sensory system with a threshold value and to command the signalling means to signal the risk of damage to the foldable roof, when the quantity detected is greater than the threshold value.

12 Claims, 4 Drawing Sheets

CONVERTIBLE MOTOR VEHICLE AND METHOD FOR CONTROLLING A FOLDABLE ROOF OF A CONVERTIBLE MOTOR VEHICLE

CROSS-REFERENCE TO RELATED APPLICATION

This patent application claims priority from Italian patent application no. 102023000025968 filed on Dec. 5, 2023, the entire disclosure of which is incorporated herein by reference.

TECHNICAL FIELD

The invention relates to a convertible motor vehicle and a method for controlling a foldable roof of a convertible motor vehicle.

BACKGROUND

Convertible motor vehicles are known comprising a frame defining a cabin adapted to accommodate the driver and possible passengers, a plurality of wheels rotatable relative to the frame, and a stowage compartment obtained at the back of the cabin along a forward direction of the motor vehicle. Such convertible motor vehicles further comprise a roof movable relative to the frame and adapted to selectively cover the cabin at a top thereof opposite to the wheels along a vertical direction of the motor vehicle, and a drive unit adapted to move the roof between an opening position, in which the roof is housed folded inside the stowage compartment and the cabin is uncovered and fluidly communicating with the outside of the motor vehicle, and a closing position, in which the roof extends outside the stowage compartment and covers the cabin.

In such convertible motor vehicles, it has been observed that arranging the folded roof in wet or humid conditions—for example, following the fall of rain or the washing of the motor vehicle—inside the stowage compartment, there is a risk of permanently damaging the foldable material of the roof. Specifically, if the roof is put back wet in the stowage compartment to its complete drying, the folds due to the folding of the roof tend to be imprinted in the foldable material, remaining visible also when the roof is extended outside the stowage compartment. This phenomenon is known in the field as "ironing effect". The visible folds of the roof not only invalidate the quality of the roof from the aesthetic point of view, but are also relevant from the structural point of view, since they determine a permanent alteration of the elastic characteristics of the foldable material, significantly reducing the useful life of the roof. In light of the above, the need is felt to reduce the risk of the formation of permanent folds in the movable roof of the convertible motor vehicles.

An object of the invention is to satisfy the need set forth above, preferably in a simple and cost-effective manner.

DESCRIPTION OF THE INVENTION

In one form, the invention can be a motor vehicle comprising a frame defining a cabin adapted to accommodate at least a driver of said motor vehicle, a plurality of wheels rotatable relative to said frame about respective rotational axes, a foldable roof movable relative to said frame and adapted to selectively cover, in use, said cabin at a top thereof opposite to said wheels along a direction vertical, in use, and a stowage compartment adapted to contain, in use, said foldable roof, said foldable roof being movable between an opening position, wherein it is housed folded inside said stowage compartment and said cabin is fluidly communicating with the outside of said motor vehicle, and a closing position, wherein said foldable roof extends outside said stowage compartment and covers said cabin, characterized in that it further comprises a sensory system adapted to detect a quantity associated with the humidity of the air inside said stowage compartment, signalling means adapted to signal, in use, a potential risk of damage to said foldable roof, an electronic control unit operatively connected to said sensory system and said signalling means, said electronic control unit being configured to compare the quantity detected, in use, by said sensory system with a threshold value and to command said signalling means to signal said potential risk of damage to said foldable roof, when said quantity detected, in use, is greater than said threshold value, in order for said foldable roof to be moved to said closing position.

In one form, the invention can be a motor vehicle comprising a frame defining a cabin adapted to accommodate at least a driver of the motor vehicle, a plurality of wheels rotatable relative to the frame about respective rotational axes, a foldable roof movable relative to the frame and adapted to selectively cover, in use, the cabin at a top thereof opposite to the wheels along a direction vertical, in use, a stowage compartment adapted to contain, in use, the foldable roof, the foldable roof being movable between an opening position, wherein the foldable roof is housed folded inside the stowage compartment and the cabin is fluidly communicating with the outside of the motor vehicle, and a closing position, wherein the foldable roof extends outside the stowage compartment and covers the cabin, a sensory system adapted to detect a quantity associated with the humidity of the air inside the stowage compartment, signalling means adapted to signal, in use, a potential risk of damage to the foldable roof, and an electronic control unit operatively connected to the sensory system and the signalling means, the electronic control unit being configured to compare the quantity detected, in use, by the sensory system with a threshold value and to command the signalling means to signal the potential risk of damage to the foldable roof, when the quantity detected, in use, is greater than the threshold value, in order for said foldable roof to be moved to the closing position.

In one form, the invention can be a motor vehicle comprising a frame, a passenger compartment adapted to accommodate a driver of the motor vehicle, a foldable roof movable relative to the frame and adapted to selectively cover the passenger compartment, a stowage compartment adapted to contain the foldable roof, the foldable roof being movable between a stowed position in which the foldable roof is housed folded inside the stowage compartment and a closed position in which the foldable roof extends outside the stowage compartment and covers the passenger compartment, a sensor system adapted to detect a quantity associated with the humidity of the air inside the stowage compartment, an actuator system, a warning system adapted to signal a potential risk of damage to the foldable roof, and an electronic control unit operatively connected to the sensor system and the warning system, the electronic control unit being configured to compare the quantity detected by the sensor system with a threshold value, and command the warning system to signal the potential risk of damage to the foldable roof when the foldable roof is in the stowed position and the quantity detected is greater than the threshold value.

In one form, the invention can be a motor vehicle comprising a frame, a passenger compartment adapted to accommodate a driver of the motor vehicle, a foldable roof movable relative to the frame and adapted to selectively cover the passenger compartment, a stowage compartment adapted to contain the foldable roof, the foldable roof being movable between a stowed position in which the foldable roof is housed folded inside the stowage compartment and a closed position in which the foldable roof extends outside the stowage compartment and covers the passenger compartment, a sensor system adapted to detect a quantity associated with the humidity of the air inside the stowage compartment, an actuator system, a warning system adapted to signal a potential risk of damage to the foldable roof, and an electronic control unit operatively connected to the sensor system and the warning system, the electronic control unit being configured to compare the quantity detected by the sensor system with a threshold value, and command the warning system to signal the potential risk of damage to the foldable roof when the foldable roof is being moved toward the stowed position and the quantity detected is greater than the threshold value.

In one form, the invention can be a method of controlling a foldable roof of a motor vehicle, the motor vehicle comprising a frame defining a cabin adapted to accommodate at least a driver of the motor vehicle, a plurality of wheels rotatable relative to the frame about respective rotational axes, the foldable roof movable relative to the frame and adapted a selectively cover, in use, the cabin at a top thereof opposite to the wheels along a direction vertical, in use, and a stowage compartment adapted to contain, in use, the foldable roof, the foldable roof being movable between an opening position, wherein it is housed folded inside the stowage compartment and the cabin is fluidly communicating with the outside of the motor vehicle, and a closing position, wherein the foldable roof extends outside the stowage compartment and covers the cabin, the method comprising the steps of detecting a quantity associated with the humidity of the air inside the stowage compartment by means of a sensory system of the motor vehicle, comparing the quantity detected during said detecting step by the sensory system with a threshold value by means of an electronic control unit of the motor vehicle, the electronic control unit being operatively connected to the sensory system, and commanding signalling means of the motor vehicle by means of the electronic control unit to signal a potential risk of damage to the foldable roof when at the end of said comparing step the detected quantity is greater than the threshold value in order for the foldable roof to be moved to the closing position, the electronic control unit being operatively connected to the signalling means.

In one form, the invention can be a method of controlling a foldable roof of a motor vehicle, the motor vehicle comprising a frame defining a cabin adapted to accommodate at least a driver of the motor vehicle, a plurality of wheels rotatable relative to the frame about respective rotational axes, the foldable roof movable relative to the frame and adapted a selectively cover, in use, the cabin at a top thereof opposite to the wheels along a direction vertical, in use, and a stowage compartment adapted to contain, in use, the foldable roof, the foldable roof being movable between an opening position, wherein it is housed folded inside the stowage compartment and the cabin is fluidly communicating with the outside of the motor vehicle, and a closing position, wherein the foldable roof extends outside the stowage compartment and covers the cabin, said method being characterized in that it comprises the steps of i) detecting a quantity associated with the humidity of the air inside the stowage compartment by means of a sensory system of the motor vehicle, ii) comparing the quantity detected during said step i) by the sensory system with a threshold value by means of an electronic control unit of the motor vehicle, the electronic control unit being operatively connected to the sensory system, and iii) commanding signalling means of the motor vehicle by means of the electronic control unit to signal a potential risk of damage to the foldable roof when at the end of said step ii) the detected quantity is greater than the threshold value, in order for the foldable roof to be moved to the closing position, the electronic control unit being operatively connected to the signalling means.

BRIEF DESCRIPTION OF THE DRAWINGS

In the following, an embodiment of the invention is described for a better understanding thereof, by way of non-limiting example and with reference to the accompanying drawings, wherein.

DETAILED DESCRIPTION OF THE INVENTION

Figure 1:
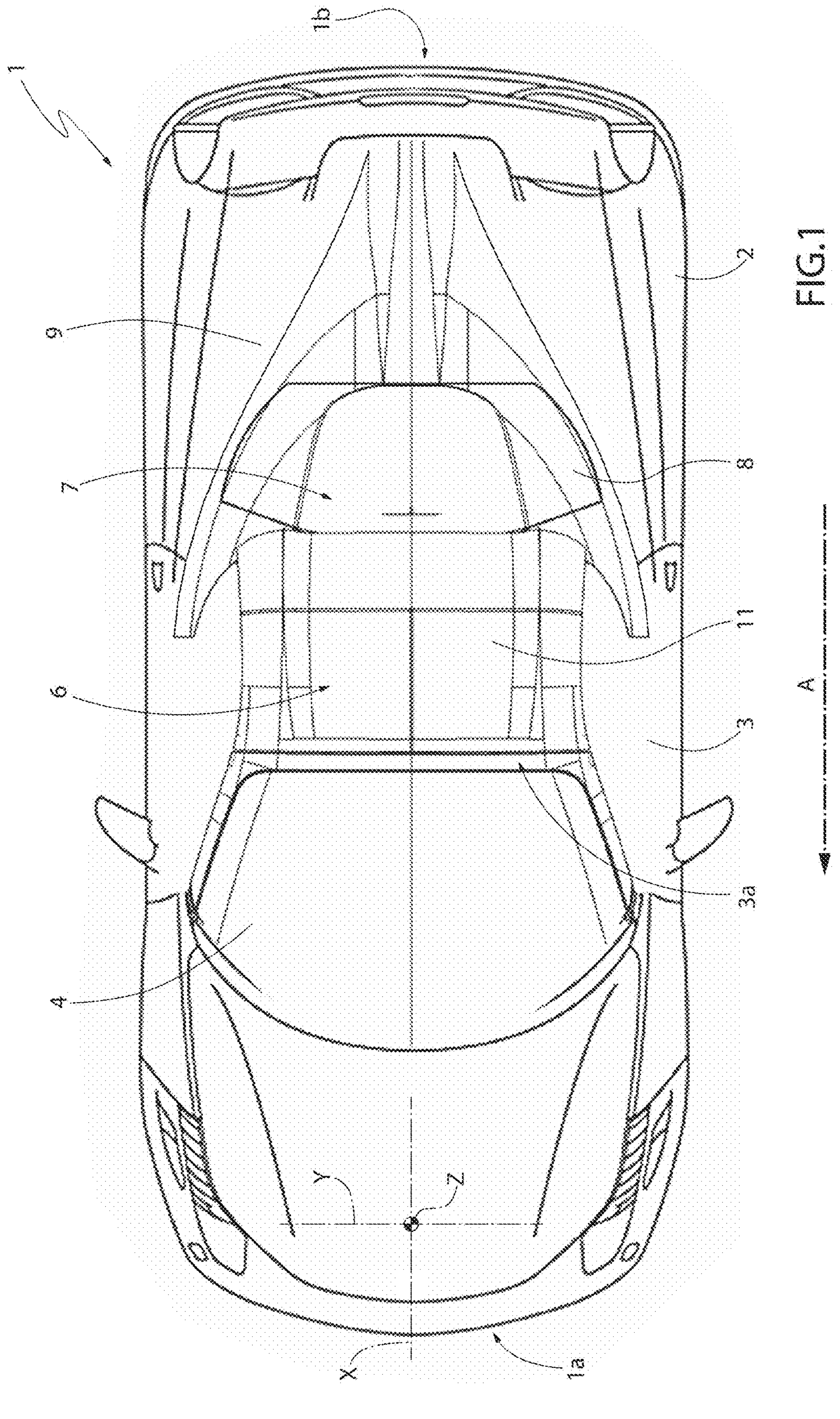
FIG. 1 is a schematic top representation of a motor vehicle according to the present invention with parts removed for clarity.

In FIG. 1, reference numeral 1 is used to indicate, as a whole, a convertible motor vehicle. Preferably and without this involving any loss of generality, the motor vehicle 1 is a cabriolet or spider car, for example of sports type.

The motor vehicle 1 comprises a frame 2 defining a cabin 3 adapted to accommodate at least a driver and possibly one or more passengers and a plurality of wheels—not illustrated—rotatable relative to the frame 2 about respective rotational axes.

The motor vehicle 1 further defines a longitudinal direction X, a direction Z, which is orthogonal to the longitudinal direction X and is vertically directed to the ground on which the wheels rest, and a direction Y which is orthogonal to the longitudinal direction X and to the direction Z.

The motor vehicle 1 also comprises a front portion 1*a* and a rear portion 1*b* relative to a forward direction A. In detail, the forward direction A is oriented in the sense directed from the rear portion 1*b* to the front portion 1*a* (FIG. 1).

Figure 4:
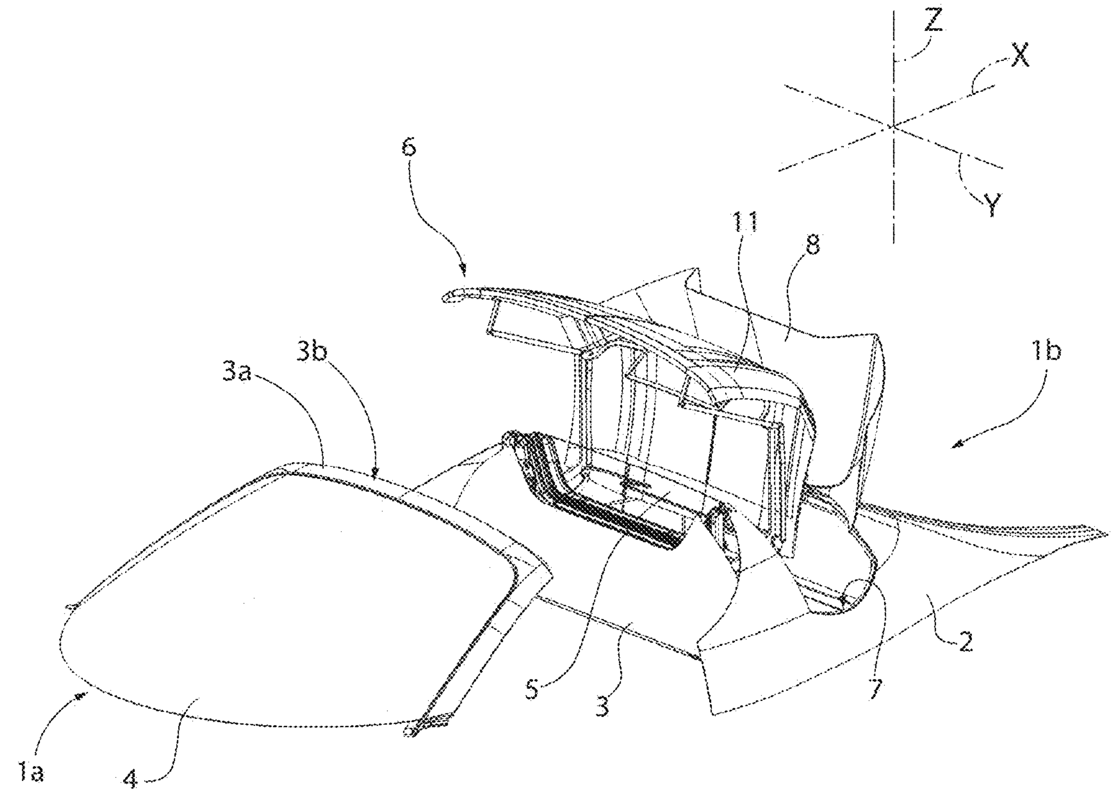
Figure 5:
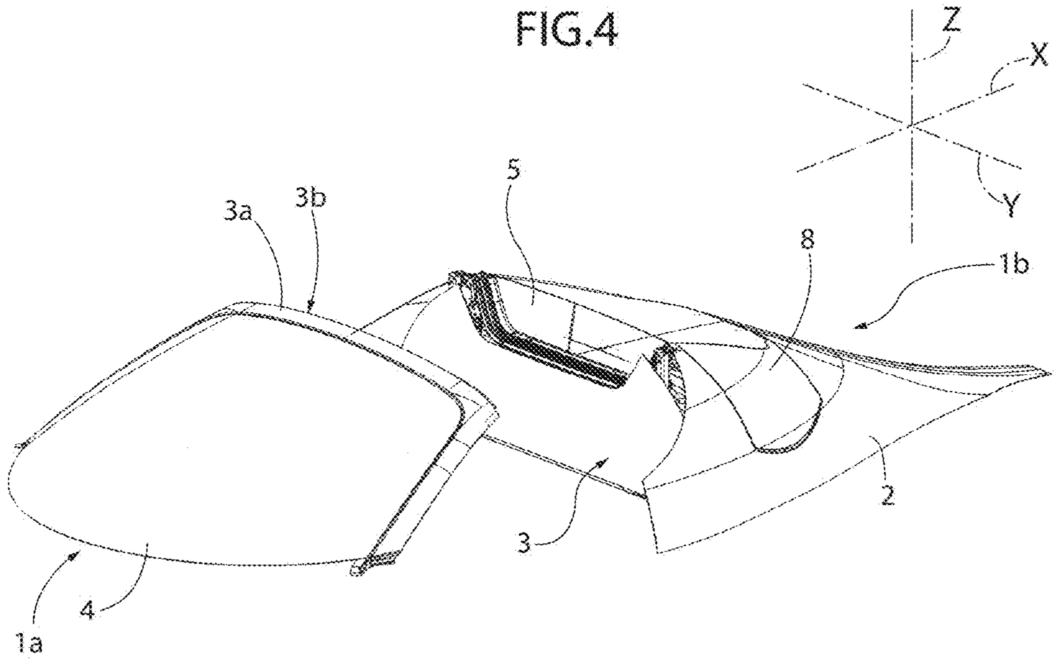

The cabin 3 comprises a top 3*a* on the side opposite the wheels along the direction Z. The top 3*a* defines an opening 3*b* through which the cabin 3 fluidly communicates with the outside of the motor vehicle 1 (FIGS. 4 and 5).

The motor vehicle 1 further comprises:

- a foldable roof 6 movable relative to the frame 2 and adapted to selectively cover the cabin 3 at the top 3*a*; and
- a stowage compartment 7 adapted to contain the foldable roof 6 in at least some operating positions thereof.

Figure 2:
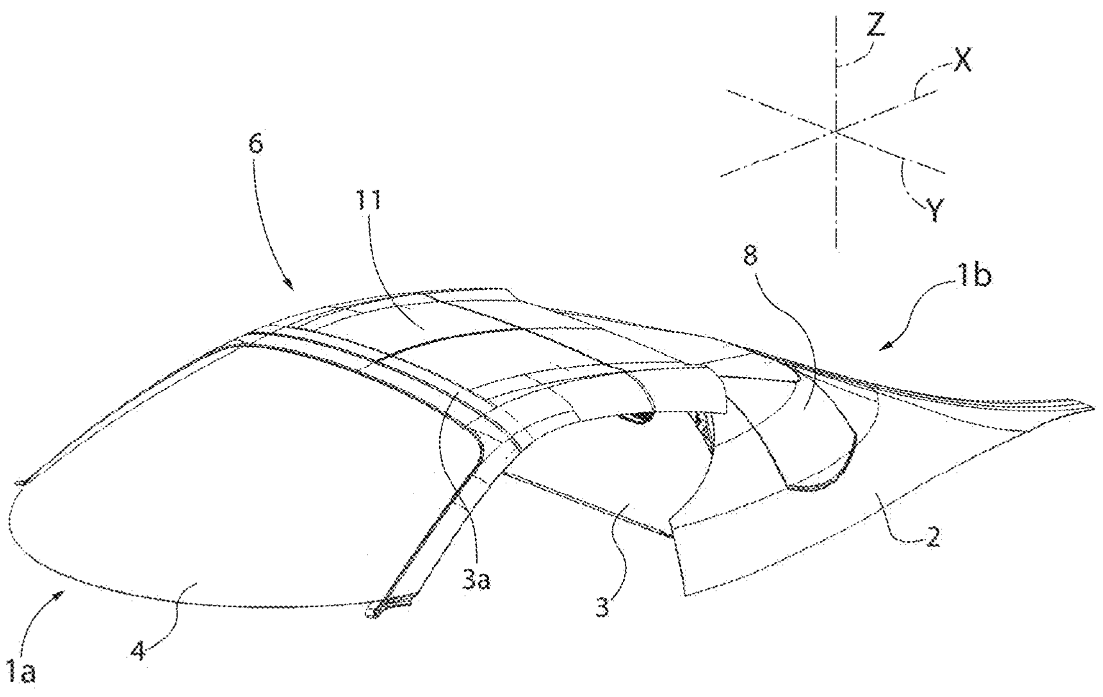
FIGS. 2-5 are schematic perspective views, with parts removed for clarity, of a portion of the motor vehicle of FIG. 1 in four respective different operating positions.
Figure 3:
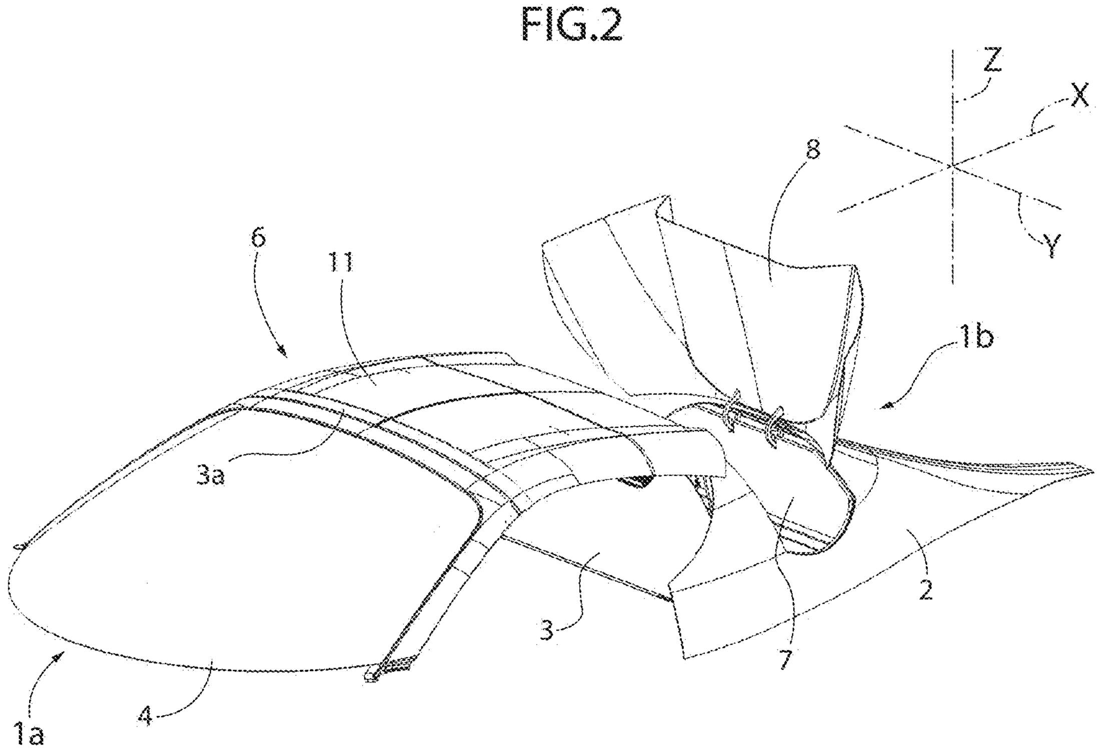

As is illustrated in FIGS. 2 to 5, the foldable roof 6 is movable between an opening position, in which it is housed folded inside the stowage compartment 7 and the cabin 3 is fluidly communicating with the outside of the motor vehicle 1 (FIG. 5), and a closing position, in which the foldable roof 6 extends outside the stowage compartment 7 and covers the cabin 3 (FIG. 2). In detail, the roof 6 comprises a cover 11, for example made of a deformable fabric. In further detail, when the foldable roof 6 is in the closing position, the cover 11 obstructs the opening 3*b* and delimits the cabin 3 at the top (FIGS. 1 and 2).

The stowage compartment 7 is interposed between the cabin 3 and the rear portion 1*b*.

In the shown embodiment, the motor vehicle 1 also comprises a lid 8 coupled in a movable manner to the frame 2 and adapted to selectively close the stowage compartment 7. In detail, the lid 8 is adapted to move between a closing position (FIGS. 2 and 5) and an opening position (FIGS. 3 and 4) of the stowage compartment 7. According to an embodiment not illustrated, the motor vehicle 1 does not comprise the lid 8 and the stowage compartment 7 is constantly fluidly communicating with the outside of the motor vehicle 1.

In the shown embodiment, the motor vehicle 1 further comprises a front windscreen 4 on the side of the front portion 1*a* and a rear window 5 on the side of the rear portion 1*b*. In detail, the front windscreen 4 and the rear window 5 are integral with the frame 2. Furthermore, the cabin 3 is delimited at the front by the front windscreen 4 and at the back by the rear window 5.

According to an embodiment not illustrated, the motor vehicle 1 comprises the front windscreen 4 and the rear window 5 is integrated in the foldable roof 6 and is therefore movable relative to the frame 2.

The motor vehicle 1 further comprises a luggage compartment 9 arranged at the rear portion 1*b*. Preferably, the stowage compartment 7 and the luggage compartment 9 communicate with each other.

Advantageously, the motor vehicle 1 further comprises (FIG. 6):

- a sensory system 50 adapted to detect a quantity u associated with the humidity of the air inside the stowage compartment 7;
- signalling means 60 adapted to signal a potential risk of damage to the foldable roof 6; and
- an electronic control unit 70 operatively connected to the sensory system 50 and the signalling means 60, the electronic control unit 70 is programmed to compare the quantity u detected by the sensory system 50 with a threshold value uθ and to command the signalling means 60 to signal the potential risk of damage to the foldable roof 6, when the detected quantity u is greater than the threshold value uθ, so as to induce a user of the motor vehicle 1 to cause the foldable roof 6 to be moved to the closing position. For example, the user is the driver or a passenger of the motor vehicle 1.

In detail, the sensory system 50 comprises one or more humidity sensors. In further detail, such humidity sensors are arranged inside the stowage compartment 7.

The quantity u is, for example, the relative humidity or the absolute humidity or the specific humidity inside the stowage compartment 7.

Figure 6:
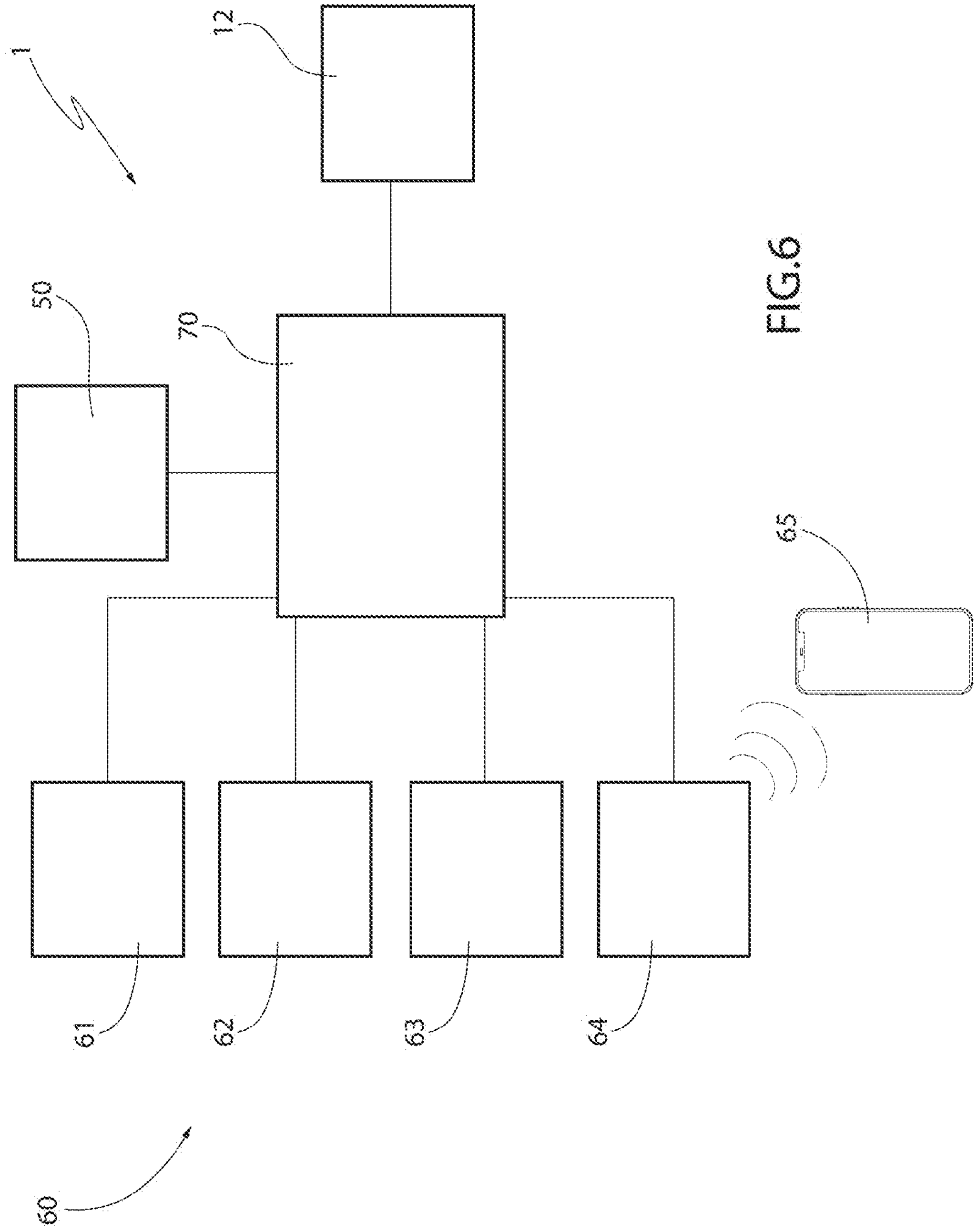
FIG. 6 is a schematic view of a portion of the motor vehicle of FIGS. 1-5.

The motor vehicle 1 also comprises a drive unit 12 adapted to automatically move the foldable roof 6 between the opening position and the closing position and operatively connected to the electronic control unit 70 (FIG. 6).

The drive unit 12 is known per se and is not described in detail in the following. By way of example, the drive unit 12 comprises an electric drive or a hydraulic drive.

The control unit 70 is programmed to command the sensory system 50 to detect the quantity u after a given time interval from the moment in which the drive unit 12 has moved the foldable roof 6 from the closing position to the opening position. This causes the possible humidity released from the wet or humid foldable roof 6 inside the stowage compartment 7 to be sufficient for being detectable by the sensory system 50.

For example, the time interval is equal to 30 seconds, or is greater than 30 seconds. Alternatively, the electronic control unit 70 is programmed to command the sensory system 50 to detect the quantity u as soon as the foldable roof 6 has reached the opening position.

Alternatively or additionally, the control unit 70 is programmed to command the sensory system 50 to periodically detect the quantity u when the foldable roof 6 is in the opening position. For example, the control unit 70 is programmed to command the detection of the quantity u at intervals of 30 seconds.

According to an embodiment of the present invention, the electronic control unit 70 is programmed to store a predetermined threshold value uθ, for example in a step of designing or calibrating the motor vehicle 1.

According to an alternative embodiment of the present invention, the control unit 70 is programmed to command the sensory system 50 to detect and/or determine the threshold value uθ. In particular, the threshold value uθ is the value of the quantity u when said foldable roof 6 is in the closing position or is moved from the closing position towards the opening position. In other words, according to such alternative embodiment, the detected quantity u is compared with a threshold value uθ determined each time the foldable roof 6 is moved towards the opening position and associated with the humidity existing in the stowage compartment 7 before placing the foldable roof 6 back in the stowage compartment 7.

Preferably, the control unit 70 is programmed to command the sensory system 50 to detect and/or determine the threshold value uθ at the same instant in which the control unit 70 commands the drive unit 12 to move the foldable roof 6 from the closing position to the opening position.

The signalling means 60 comprise at least one of an indicator light 61, a sound emitter 62, a control panel 63 and a transceiver 64 (FIG. 6).

In detail, the indicator light 61 is adapted to emit a light signal for signalling to a user of the motor vehicle 1 the risk of damage to the foldable roof 6. For example, the indicator light 61 is arranged in the cabin 3 and/or is visible from the cabin 3.

The sound emitter 62 is adapted to emit a sound signal for signalling to a user of the motor vehicle 1 the risk of damage to the foldable roof 6, for example, so that such sound signal is audible inside the cabin 3.

The control panel 63 is for example an infotainment system arranged in the cabin 3.

The transceiver 64 is adapted to be remotely operatively connected to a mobile device 65, for example, a smartphone or a tablet. In detail, the transceiver 64 is adapted to send a signal to said mobile device 65 for signalling to a user of the mobile device 65 the risk of damage to the foldable roof 6.

In the following, the operation of the motor vehicle 1 is described.

In use, a user of the motor vehicle 1 commands the automatic movement of the foldable roof 6 between the opening position and the closing position by means of the drive unit 12.

During the operation, the sensory system 50 detects the value of the quantity u inside the stowage compartment 7 and the control unit 70 compares such detected value of the quantity u with the threshold value uθ. If the detected quantity u is greater than the threshold value uθ, it is likely that the foldable roof 6 is humid or wet. Consequently, the control unit 70 commands the signalling means 60 to signal the potential risk of damage to the foldable roof 6. In this manner, the user of the motor vehicle 1 is induced to move the foldable roof 6 to the closing position or to command the movement of the foldable roof 6 to the closing position by means of the drive unit 12, allowing its correct drying outside the stowage compartment 7.

In detail, the sensory system 50 detects the quantity u after a given time interval from the conclusion of the movement of the foldable roof 6 to the opening position. Alternatively or additionally, the sensory system 50 periodically detects the value of the quantity u in the stowage compartment 7 when the foldable roof 6 is in the opening position.

Additionally, the threshold value uθ is predetermined ab initio and stored in the electronic control unit 70, or is detected and/or determined in real time by the sensory system 50 at each movement of the foldable roof 6 towards the opening position. In detail, the control unit 70 commands the sensory system 50 to detect the value of the quantity u when the foldable roof 6 is in the closing position or is moved from the closing position towards the opening position (for example, following a command of a user of the motor vehicle 1) and utilises such detected value as threshold value uθ for the following comparison.

Based on the foregoing, the advantages of the motor vehicle 1 and of the control method according to the invention are evident.

In particular, since the electronic control unit 70 is programmed to compare the quantity u detected by the sensory system 50 with the threshold value uθ and to command the signalling means 60 to signal the risk of damage to the foldable roof 6 when the detected quantity u is greater than the threshold value uθ, the risk of the formation of the permanent folds in the foldable roof 6 is significantly reduced. In fact, the user of the motor vehicle 1, once informed of the risk, will be induced to command the movement of the foldable roof 6 to the closing position, allowing a correct drying thereof outside the stowage compartment 7.

Since the detection of the quantity u occurs after a given time interval from the moment in which the drive unit 12 has moved the foldable roof 6 from the closing position to the opening position, it is possible to improve the efficiency with which the possible humidity formed inside the stowage compartment 7 can be detected.

Since the control unit 70 is programmed to command the sensory system 50 to periodically detect the quantity u when the foldable roof 6 is in the opening position, it is possible to control with a high level of reliability the presence of humidity or an increase in the same in the stowage compartment 7.

Since the detected quantity u is compared with a threshold value uθ determined each time and associated with the humidity existing in the stowage compartment 7 before the placing of the foldable roof 6 back in the stowage compartment 7, the possible formation of humidity in the stowage compartment 7 is determined based on a threshold value updated over time, which can also keep into account atmospheric humidity variations outside the motor vehicle 1.

Finally, it is clear that modifications and variations can be made to the motor vehicle 1 and to the control method according to the invention, which do not anyway depart from the scope of protection defined by the claims.

The invention claimed is:

1. A motor vehicle, comprising:

a frame defining a cabin adapted to accommodate at least a driver of the motor vehicle;

a plurality of wheels rotatable relative to the frame about respective rotational axes;

a foldable roof movable relative to the frame and adapted to selectively cover the cabin at a top thereof opposite to the wheels along a direction vertical;

a stowage compartment adapted to contain the foldable roof, the foldable roof being movable between an opening position, wherein the foldable roof is housed folded inside the stowage compartment and the cabin is fluidly communicating with the outside of the motor vehicle, and a closing position, wherein the foldable roof extends outside the stowage compartment and covers the cabin;

a sensory system adapted to detect a quantity associated with the humidity of the air inside the stowage compartment;

signalling means adapted to signal a potential risk of damage to the foldable roof; and an electronic control unit operatively connected to the sensory system and the signalling means, the electronic control unit being configured to compare the quantity detected by the sensory system with a threshold value and to command the signalling means to signal the potential risk of damage to the foldable roof, when the quantity detected is greater than the threshold value, in order for said foldable roof to be moved to the closing position, wherein the electronic control unit is programmed to command the sensory system to detect the threshold value, the threshold value being the value of the quantity when the foldable roof is in the closing position or when it is moved from the closing position towards the opening position.

2. The motor vehicle according to claim 1, further comprising a drive unit adapted to automatically move the foldable roof between the opening position and the closing position, the drive unit being operatively connected to the electronic control unit, and the electronic control unit being programmed to command the sensory system to detect the quantity after a time interval from the moment in which the drive unit has moved the foldable roof from the closing position to the opening position.

3. The motor vehicle according to claim 1, wherein the electronic control unit is programmed to command the sensory system to periodically detect the quantity when the foldable roof is, in use, in the opening position.

4. The motor vehicle according to claim 1, wherein the signalling means comprises an indicator light.

5. The motor vehicle according to claim 1, wherein the signalling means comprises a sound emitter.

6. The motor vehicle according to claim 1, wherein the signalling means comprises a control panel.

7. The motor vehicle according to claim 1, wherein the signalling means comprises a transceiver adapted to be remotely operatively connected to a mobile device.

8. The motor vehicle according to claim 1, wherein the signalling means comprises an indicator light, a sound emitter, a control panel, and/or a transceiver adapted to be remotely operatively connected to a mobile device.

9. A method of controlling a foldable roof of a motor vehicle, the motor vehicle comprising a frame defining a cabin adapted to accommodate at least a driver of the motor vehicle, a plurality of wheels rotatable relative to the frame about respective rotational axes, the foldable roof movable relative to the frame and adapted a selectively cover the cabin at a top thereof opposite to the wheels along a direction vertical and a stowage compartment adapted to contain the foldable roof, the foldable roof being movable between an opening position, wherein it is housed folded inside the stowage compartment and the cabin is fluidly communicating with the outside of the motor vehicle, and a closing position, wherein the foldable roof extends outside the stowage compartment and covers the cabin, the method comprising the steps of:

detecting a quantity associated with the humidity of the air inside the stowage compartment by means of a sensory system of the motor vehicle;

comparing the quantity detected during said detecting step by the sensory system with a threshold value by means of an electronic control unit of the motor vehicle, the electronic control unit being operatively connected to the sensory system;

commanding signalling means of the motor vehicle by means of the electronic control unit to signal a potential risk of damage to the foldable roof when at the end of said comparing step the detected quantity is greater than the threshold value in order for the foldable roof to be moved to the closing position, the electronic control unit being operatively connected to the signalling means; and detecting the threshold value by means of the sensory system, the threshold value being the value of the quantity when the foldable roof is in the closing position or is moved from the closing position towards the opening position.

10. The method according to claim 9, wherein said detecting step is commanded by the electronic control unit after a time interval from the moment in which a drive unit of the motor vehicle has moved the foldable roof from the closing position to the opening position.

11. The method according to claim 9, wherein the detecting step is periodically commanded by the electronic control unit the while said foldable roof is in the opening position.

12. A motor vehicle, comprising:

a frame;

a passenger compartment adapted to accommodate a driver of the motor vehicle;

a foldable roof movable relative to the frame and adapted to selectively cover the passenger compartment;

a stowage compartment adapted to contain the foldable roof, the foldable roof being movable between a stowed position in which the foldable roof is housed folded inside the stowage compartment and a closed position in which the foldable roof extends outside the stowage compartment and covers the passenger compartment;

a sensor system adapted to detect a quantity associated with the humidity of the air inside the stowage compartment;

an actuator system;

a warning system adapted to signal a potential risk of damage to the foldable roof; and an electronic control unit operatively connected to the sensor system and the warning system, the electronic control unit being configured to:

compare the quantity detected by the sensor system with a threshold value; and command the warning system to signal the potential risk of damage to the foldable roof when the foldable roof is in the stowed position and the quantity detected is greater than the threshold value, wherein the electronic control unit is configured to command the warning system to signal the potential risk of damage to the foldable roof when the foldable roof is being moved toward the stowed position and the quantity detected is greater than the threshold value.

* * * * *